US007397356B1

(12) United States Patent
Johnson

(10) Patent No.: US 7,397,356 B1
(45) Date of Patent: Jul. 8, 2008

(54) EMERGENCY VEHICLE NOTIFICATION SYSTEM

(76) Inventor: Thomas D. Johnson, 2037 W. 100 North, Albion, IN (US) 46701

( * ) Notice: Subject to any disclaimer, the term of this patent is extended or adjusted under 35 U.S.C. 154(b) by 212 days.

(21) Appl. No.: 11/295,025

(22) Filed: Dec. 5, 2005

(51) Int. Cl.
*B60Q 1/52* (2006.01)

(52) U.S. Cl. ........................ 340/471; 340/902; 340/903; 340/435; 340/436; 340/447; 340/539.1; 701/301

(58) Field of Classification Search ................. 340/471, 340/901, 902, 903, 905, 539.1, 539.13, 435, 340/436, 988, 992, 447, 467; 180/167; 701/300, 701/301
See application file for complete search history.

(56) References Cited

U.S. PATENT DOCUMENTS

| | | | | |
|---|---|---|---|---|
| 5,933,093 A * | 8/1999 | Austin, II | ................... | 340/902 |
| 6,087,961 A * | 7/2000 | Markow | ..................... | 340/902 |
| 6,822,580 B2 * | 11/2004 | Ewing et al. | ................ | 340/902 |

* cited by examiner

*Primary Examiner*—Hung Nguyen

(57) ABSTRACT

An emergency vehicle notification system is disclosed. The emergency vehicle notification system includes a transmitter unit including a transmitter microprocessor. A transmitter is connected to the transmitter microprocessor and is adapted to emit radio waves. A transmission strength gauge connected to the transmitter is adapted to measure and indicate the strength of the radio waves. A receiver unit is adapted to receive the radio waves from the transmitter. The receiver unit includes a receiver microprocessor and at least one light connected to the receiver microprocessor.

20 Claims, 4 Drawing Sheets

EMERGENCY VEHICLE NOTIFICATION SYSTEM

FIELD OF THE INVENTION

The present invention relates to notification systems for notifying motorists of the approach of emergency vehicles. More particularly, the present invention relates to an emergency vehicle notification system which is capable of alerting motorists to the approach of an emergency vehicle using auditory and visual sensory input.

BACKGROUND OF THE INVENTION

Emergency vehicles are adapted to alert motorists to their approach typically using a siren and flashing lights. However, many motorists listen to a radio, compact disk or the like as they drive. Furthermore, many cars are virtually sound-proof. Therefore, the siren sound of approaching emergency vehicles may not be discernable to motorists.

SUMMARY OF THE INVENTION

The present invention is generally directed to an emergency vehicle notification system. The emergency vehicle notification system includes a transmitter unit including a transmitter microprocessor. A transmitter is connected to the transmitter microprocessor and is adapted to emit radio waves. A transmission strength gauge connected to the transmitter is adapted to measure and indicate the strength of the radio waves. A receiver unit is adapted to receive the radio waves from the transmitter. The receiver unit includes a receiver microprocessor and at least one light connected to the receiver microprocessor.

BRIEF DESCRIPTION OF THE DRAWINGS

The invention will now be described, by way of example, with reference to the accompanying drawings, in which.

DETAILED DESCRIPTION OF THE INVENTION

Figure 6:
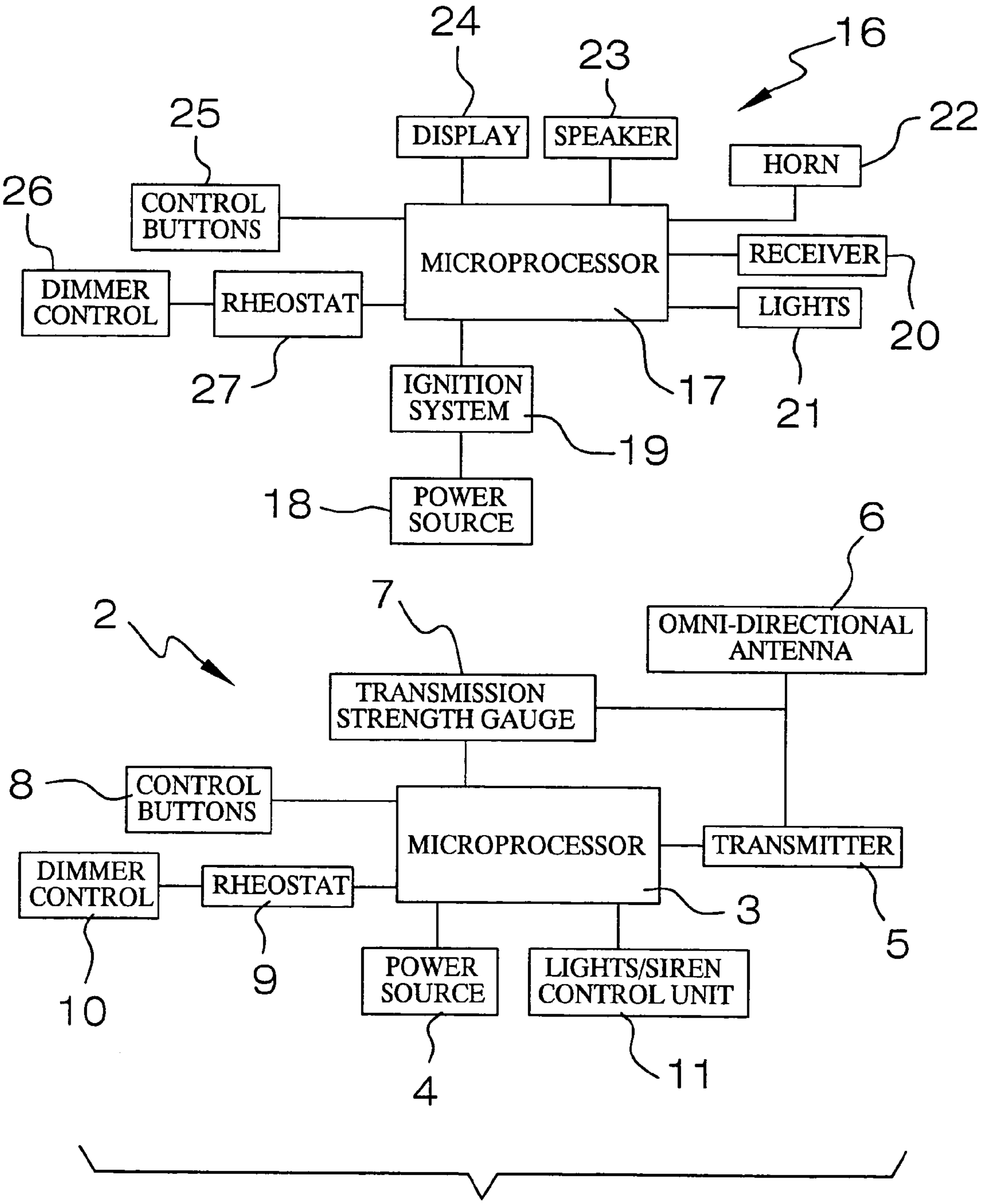
FIG. 6 is a block diagram of a receiver unit (top) and a transmitter unit (bottom) of an illustrative embodiment of an emergency vehicle notification system according to the present invention.

Referring to the drawings, an illustrative embodiment of an emergency vehicle notification system, hereinafter system, according to the present invention is generally indicated by reference numeral 1 in the block diagram of FIG. 6. The system 1 includes a transmitter unit 2 which is provided in an emergency vehicle 36 and a receiver unit 16 which is provided in a passenger vehicle 40. As will be hereinafter described, in an emergency situation, the transmitter unit 2 on the emergency vehicle 36 is adapted to emit radio signals which are received by the receiver unit 16 on the passenger vehicle 40. The receiver unit 16 emits audible and/or visual alert signals to a motorist driving the passenger vehicle 40, thereby enabling the passenger vehicle 40 to take evasive steps which enable the emergency vehicle 36 to navigate through traffic in as unhindered a fashion as possible.

Figure 3:
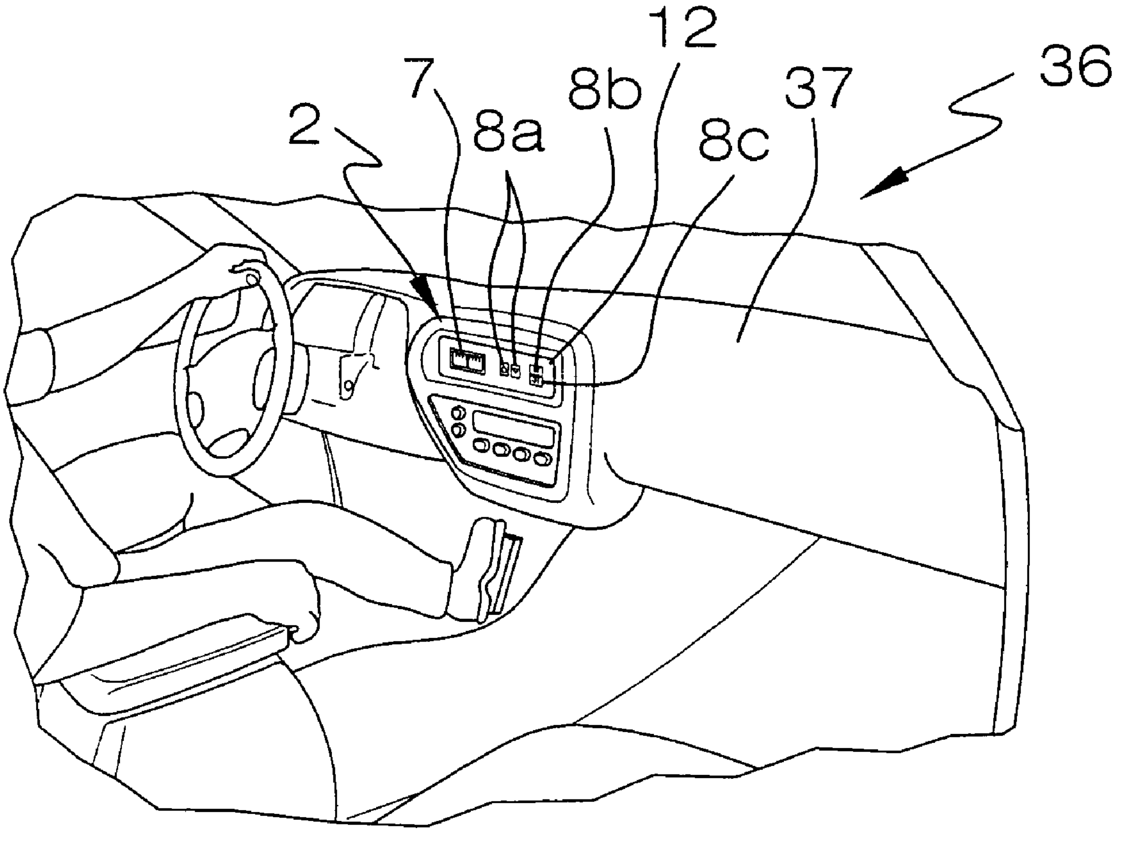
FIG. 3 is a perspective view of a dashboard of an emergency vehicle (in section), illustrating a transmitter unit of an illustrative embodiment of an emergency vehicle notification system according to the present invention provided in the dashboard of the emergency vehicle.

As shown in FIG. 3, the transmitter unit 2 of the emergency vehicle 36 is typically provided in the dashboard 37 or other location inside the emergency vehicle 36. The transmitter unit 2 may include a transmitter console 12 which contains at least some of the functional components of the transmitter unit 2. As shown in FIG. 6, the functional components of the transmitter unit 2 include a transmitter microprocessor 3 which is typically provided in the transmitter console 12. A power source 4, which may be a vehicle battery, for example, is connected to the transmitter microprocessor 3. A transmitter 5 is further connected to the transmitter microprocessor 3 for emitting radio waves from the transmitter unit 2, as will be hereinafter described. An omni-directional antenna 6 may be connected to the transmitter 5 for broadcasting the radio waves in multiple directions from the emergency vehicle 36. A transmission strength gauge 7 may be connected to the omni-directional antenna 6 and the transmitter microprocessor 3 to indicate the strength of radio waves broadcasted from the omni-directional antenna 6.

Figure 5:
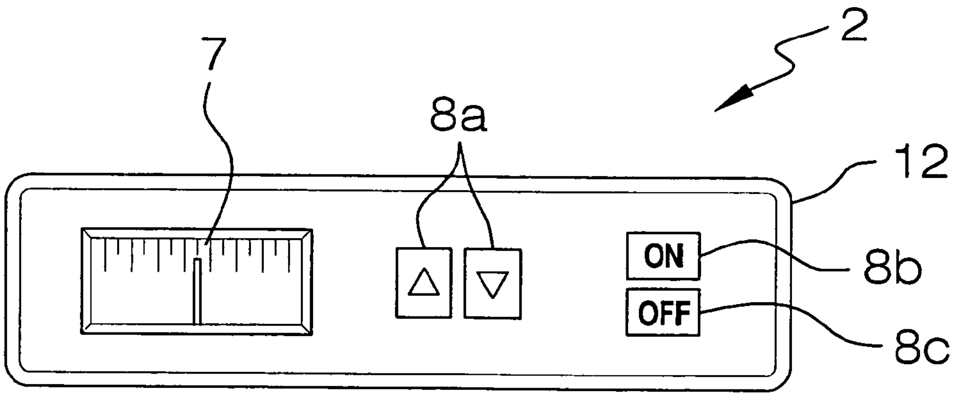
FIG. 5 is a front view of a transmitter unit of an illustrative embodiment of an emergency vehicle notification system according to the present invention.

Various control buttons 8 are connected to the transmitter microprocessor 3. As shown in FIG. 5, these may include, for example, range switches **8*a* which are used to select the range of radio waves emitted from the transmitter 5, as well as an "on" switch 8*b* and an "off" switch 8*c* for turning the transmitter unit 2 on and off. A rheostat 9 may be connected to the transmitter microprocessor 3 and a dimmer control 10 connected to the rheostat 9. A lights/siren control unit 11 of the emergency vehicle 36 may be connected to the transmitter microprocessor 3 for automatic activation of the emergency lights and siren components of the emergency vehicle 36 upon manipulation of the "on" switch 8*b*. As shown in FIG. 5, the transmission strength gauge 7, range switches 8*a*, "on" switch 8*b* and "off" switch 8*c* are typically provided on the exterior of the transmitter console 32 and face the interior of the emergency vehicle 36, as shown in FIG. 3**.

Figure 2:
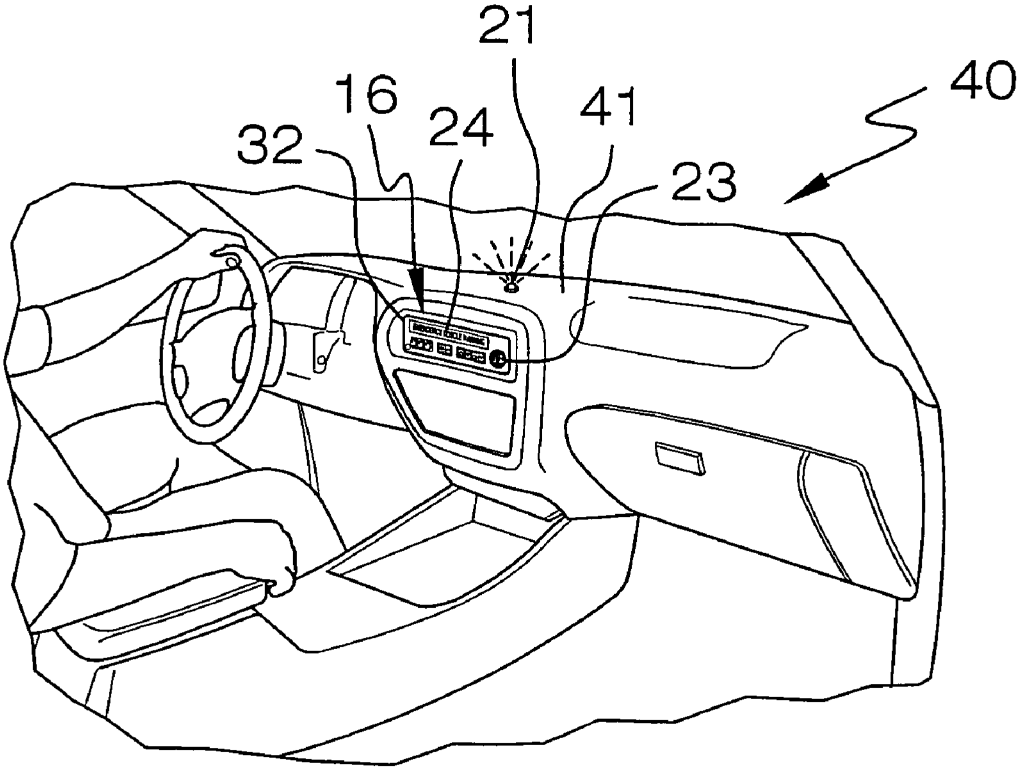
FIG. 2 is a perspective view of a dashboard of a passenger vehicle (in section), illustrating a receiver unit of an illustrative embodiment of an emergency vehicle notification system according to the invention provided in the dashboard of the passenger vehicle.

As shown in FIG. 2, the receiver unit 16 of the passenger vehicle 40 may include a receiver console 32 which is is typically provided on the dashboard 41 or other location inside the passenger vehicle 40. As shown in FIG. 6, the receiver unit 16 may include a receiver microprocessor 17 which may be contained in the receiver console 32 and to which is connected a power source 18. The power source 18 may be, for example, a vehicle battery which is connected to the receiver microprocessor 17 through a vehicle ignition system 19. A receiver 20 is connected to the receiver microprocessor 17 for receiving radio waves emitted by the transmitter 5 of the transmitter unit 2 on the emergency vehicle 36. At least one, and typically, multiple alert lights 21 are connected to the receiver microprocessor 17. A horn 22, which may be the horn of the passenger vehicle 40, for example, may be connected to the receiver microprocessor 17. A speaker 23 and a display 24 may further be connected to the receiver microprocessor 17.

Figure 4:
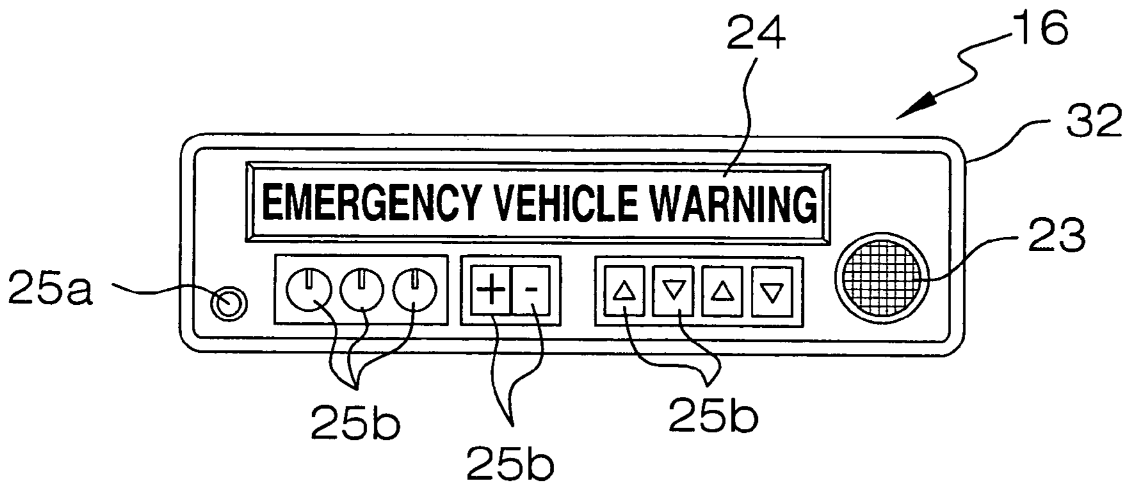
FIG. 4 is a front view of a receiver unit of an illustrative embodiment of an emergency vehicle notification system according to the present invention.

Various control buttons 25 are connected to the receiver microprocessor 17 and may include, for example, a power button **25*a* and various other control buttons 25*b* which may be used to control the speaker 23 and/or the display 24, for example, as shown in FIG. 4. A rheostat 27 may be connected to the receiver microprocessor 17 and a dimmer control 26 connected to the rheostat 27 to facilitate selective dimming and brightening of the light or lights 21 during activation of the receiver unit 16, as will be hereinafter further described. As shown in FIGS. 2 and 4, the speaker 23, display 24 and control buttons 25 are typically provided on the exterior of the receiver console 32 and face the interior of the passenger vehicle 40. The alert light or lights 21 is/are typically provided on the dashboard 41 or other location inside the passenger vehicle 40**.

In typical operation of the system 1, in the event of an emergency situation, the driver of the emergency vehicle 36 manipulates the "on" button **8*b* of the transmitter unit 2 to activate the lights/siren control unit 11 typically through the transmitter microprocessor 3. Simultaneously, the transmitter microprocessor 3 causes the transmitter 5 to emit radio waves, which may be broadcasted in multiple directions by the omni-directional antenna 6. The strength of the radio waves broadcasted by the omni-directional antenna 6 may be selected depending on whether the emergency vehicle 36 is traveling in a rural area (in which case the strength of the radio waves is increased) or in a city (in which case the strength of the radio waves is decreased). This may be accomplished by, for example, manipulation of the appropriate range switches 8*a* on the transmitter console 12. The relative strength of the radio waves broadcasted from the omni-directional antenna 6 is measured by and indicated on the transmission strength gauge 7**.

Figure 1:
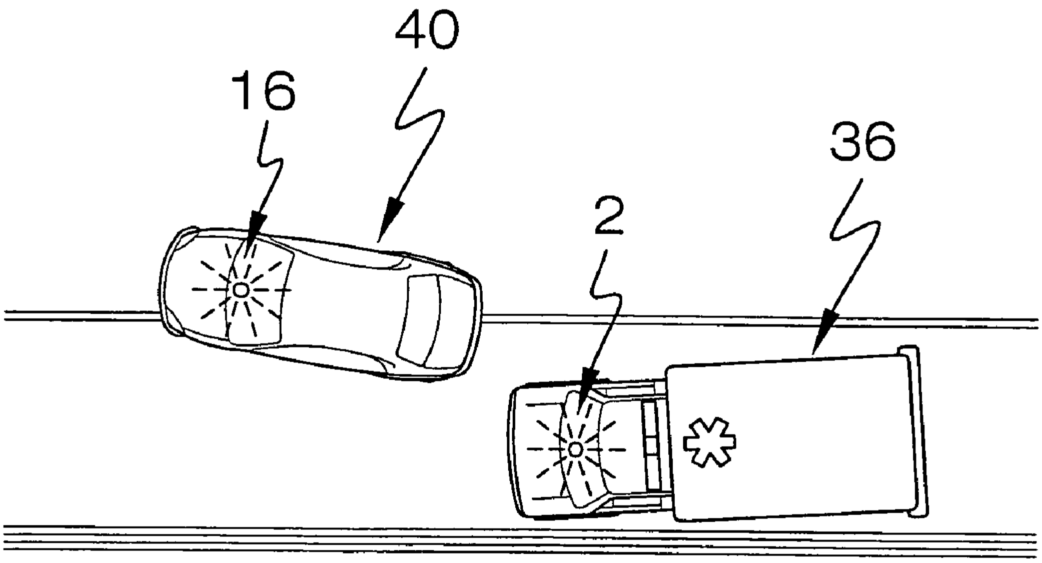
FIG. 1 is a top view of a passenger vehicle evading an emergency vehicle in typical application of an illustrative embodiment of an emergency vehicle notification system according to the present invention.

The radio waves broadcasted from the omni-directional antenna 6 of the transmitter unit 2 are received by the receiver 20 of the receiver unit 16. Accordingly, the receiver microprocessor 17 typically activates the alert light or lights 21 in the passenger vehicle 40, along with broadcasting a beeping sound, siren, song or other alerting sound from the speaker 23. The receiver microprocessor 17 may further activate the horn 22. Furthermore, the receiver microprocessor 17 may display a warning indication on the display 24, such as, for example, "EMERGENCY VEHICLE WARNING" or the like, as shown in FIG. 4. The brightness of the alert light or lights 21 may be controlled using the dimmer control 26. These sensory stimuli warn the motorist in the passenger vehicle 40 that the emergency vehicle 36 is approaching the passenger vehicle 40, thereby enabling the motorist in the passenger vehicle 40 to move over to one side of the road, for example, as shown in FIG. 1, or otherwise evade the traveling path of the emergency vehicle 36 in order to facilitate unhindered navigation of the emergency vehicle 36 through traffic and to the emergency site, hospital or other destination.

While the preferred embodiments of the invention have been described above, it will be recognized and understood that various modifications can be made in the invention and the appended claims are intended to cover all such modifications which may fall within the spirit and scope of the invention.

What is claimed is:

1. An emergency vehicle notification system, comprising:

a transmitter unit comprising a transmitter coupled with a microprocessor and adapted to emit radio waves, and a transmission strength gauge connected to said transmitter and adapted to measure and indicate strength of said radio waves; and a receiver unit adapted to receive said radio waves from said transmitter, said receiver unit comprising a receiver microprocessor and at least one light connected to said receiver microprocessor.

2. The system of claim 1 further comprising a display connected to said microprocessor coupled with said receiver.

3. The system of claim 1 further comprising a speaker connected to said microprocessor coupled with said receiver.

4. The system of claim 1 further comprising a horn connected to said microprocessor coupled with said receiver.

5. The system of claim 1 further comprising a rheostat connected to said microprocessor coupled with said receiver and a dimmer control connected to said rheostat for controlling brightness of said at least one light.

6. The system of claim 1 further comprising a lights/siren control unit connected to said microprocessor coupled with said transmitter.

7. The system of claim 1 wherein said transmitter unit comprises a transmitter console and wherein said microprocessor coupled with said transmitter is provided in said transmitter console.

8. The system of claim 1 wherein said receiver unit comprises a receiver console and wherein said microprocessor coupled with said receiver is provided in said receiver console.

9. A emergency vehicle notification system, comprising:

a transmitter unit comprising a transmitter coupled with a microprocessor and adapted to emit radio waves, an omni-directional antenna connected to said transmitter and a transmission strength gauge connected to said transmitter and adapted to measure and indicate strength of said radio waves; and a receiver unit adapted to receive said radio waves from said transmitter, said receiver unit comprising a receiver microprocessor and at least one light connected to said receiver microprocessor.

10. The system of claim 9 further comprising a display connected to said microprocessor coupled with said receiver.

11. The system of claim 9 further comprising a speaker connected to said microprocessor coupled with said receiver.

12. The system of claim 9 further comprising a horn connected to said microprocessor coupled with said receiver.

13. The system of claim 9 further comprising a rheostat connected to said microprocessor coupled with said receiver and a dimmer control connected to said rheostat for controlling brightness of said at least one light.

14. The system of claim 9 further comprising a lights/siren control unit connected to said microprocessor coupled with said transmitter.

15. The system of claim 9 wherein said transmitter unit comprises a transmitter console and wherein said microprocessor coupled with said transmitter is provided in said transmitter console.

16. The system of claim 9 wherein said receiver unit comprises a receiver console and wherein said microprocessor coupled with said receiver is provided in said receiver console.

17. An emergency vehicle notification system, comprising:

a transmitter unit comprising a transmitter console, a microprocessor provided in said transmitter console, a transmitter connected to said microprocessor in said transmitter console and adapted to emit radio waves, and a transmission strength gauge connected to said transmitter and carried by said transmitter console and adapted to measure and indicate strength of said radio waves; and a receiver unit adapted to receive said radio waves from said transmitter, said receiver unit comprising a microprocessor coupled with said receiver and at least one light connected to said microprocessor.

18. The system of claim 17 further comprising a receiver console and wherein said receiver microprocessor is provided in said receiver console.

19. The system of claim 18 further comprising a display connected to said microprocessor coupled with said receiver and carried by said receiver console.

20. The system of claim 18 further comprising a speaker connected to said microprocessor coupled with said receiver and carried by said receiver console.

* * * * *